US012235369B2

(12) United States Patent
Jenkins et al.

(10) Patent No.: US 12,235,369 B2
(45) Date of Patent: Feb. 25, 2025

(54) TECHNIQUES FOR VALIDATING UAV POSITION USING VISUAL LOCALIZATION

(71) Applicant: WING Aviation LLC, Mountain View, CA (US)

(72) Inventors: Kevin Jenkins, Dallas, TX (US); Damien Jourdan, San Jose, CA (US); Jeremie Gabor, Mountain View, CA (US)

(73) Assignee: Wing Aviation LLC, Palo Alto, CA (US)

( * ) Notice: Subject to any disclaimer, the term of this patent is extended or adjusted under 35 U.S.C. 154(b) by 420 days.

(21) Appl. No.: 17/864,031

(22) Filed: Jul. 13, 2022

(65) Prior Publication Data

US 2024/0019589 A1    Jan. 18, 2024

(51) Int. Cl.
*G01S 19/48*      (2010.01)
*G01S 19/26*      (2010.01)
*G01S 19/40*      (2010.01)

(52) U.S. Cl.
CPC ............ *G01S 19/485* (2020.05); *G01S 19/26* (2013.01); *G01S 19/40* (2013.01)

(58) Field of Classification Search
None
See application file for complete search history.

(56) References Cited

U.S. PATENT DOCUMENTS

| | | |
|---|---|---|
| 9,720,095 B2 | 8/2017 | Rife |
| 9,862,488 B2 | 1/2018 | Hunt et al. |
| 10,386,843 B2 | 8/2019 | Worsham |
| 10,387,727 B2 | 8/2019 | Abeywardena et al. |
| 10,732,647 B2 | 8/2020 | Shen |
| 10,908,622 B2 | 2/2021 | Abeywardena et al. |
| 2012/0127030 A1 | 5/2012 | Arthur et al. |

(Continued)

FOREIGN PATENT DOCUMENTS

GB    2582842 A    10/2020

OTHER PUBLICATIONS

Bianchi et al., UAV Localization Using Autoencoded Satellite Images, IEEE Robotics and Automation Letters, Feb. 10, 2021, 8 pages.

(Continued)

*Primary Examiner* — Frantz Bataille
(74) *Attorney, Agent, or Firm* — Christensen O'Connor Johnson Kindness PLLC

(57) ABSTRACT

Systems and methods for validating a position of an unmanned aerial vehicle (UAV) are provided. A method can include receiving map data for a location, the map data including labeled data for a plurality of landmarks in a vicinity of the location. The method can include generating image data for the location, the image data being derived from images of the vicinity generated by the UAV including at least a subset of the plurality of landmarks. The method can include determining a visual position of the UAV using the image data and the map data. The method can include determining a Global Navigation Satellite System (GNSS) position of the UAV. The method can include generating an error signal using the visual position and the GNSS position. The method can also include validating the GNSS position in accordance with the error signal satisfying a transition condition.

20 Claims, 7 Drawing Sheets

(56) References Cited

U.S. PATENT DOCUMENTS

2019/0080142 A1* 3/2019 Abeywardena .... G01C 21/3852
2021/0375145 A1* 12/2021 Wissler ................. G01S 19/15

OTHER PUBLICATIONS

Chen et al., Real-time Geo-localization Using Satellite Imagery and Topography for Unmanned Aerial Vehicles, arXiv:2108.03344v1, Aug. 7, 2021, 7 pages.
Chowdhary et al., GPS-Denied Indoor and Outdoor Monocular Vision Aided Navigation and Control of Unmanned Aircraft, Journal of Field Robotics, Mar. 19, 2013, 45 pages.
Jackson Enabling Autonomous Operation of Micro Aerial Vehicles Through GPS to GPS-Denied Transitions, Brigham Young University, Nov. 11, 2019, 204 pages.
Patel et al., Visual Localization with Google Earth Images for Robust Global Pose Estimation of UAVs, IEEE International Conference on Robotics and Automation (ICRA), 2020, 8 pages.
Schonberger et al., Semantic Visual Localization, Proceedings of the IEEE Conference on Computer Vision and Pattern Recognition (CVPR), 2018, 11 pages.
PCT International Search Report and Written Opinion mailed May 27, 2024, in corresponding International Application No. PCT/US2023/024171, 21 pages.
Patton et al., 'A Review of Parity Space Approaches To Fault Diagnosis', In Fault Detection, Supervision and Safety for Technical Processes, Jan. 1, 1992, Oxford; Pergamon Press, 1992, US, XP093143439, ISBN: 978-0-08-041275-7, pp. 65-81.
PCT Invitation to Pay Additional Fees and Partial International Search Report mailed Apr. 5, 2024, in corresponding International Application No. PCT/US2023/024171, 12 pages.

* cited by examiner

TECHNIQUES FOR VALIDATING UAV POSITION USING VISUAL LOCALIZATION

TECHNICAL FIELD

This disclosure relates generally to unmanned aerial vehicles (UAVs), and in particular but not exclusively, relates to localization of UAVs without reference to geofiducials.

BACKGROUND INFORMATION

As fleets of unmanned aerial vehicles (UAVs), also referred to as drones, are enlisted for small package deliveries, aerial photography, public safety, etc., UAVs will operate in increasing numbers and with increasing frequency to meet customer demand. For UAVs, a typical mission will include a flight departing from a base location, also referred to as a "nest," that may include multiple stops at one or more locations before returning to the base location (e.g., where the UAV is based at a given location). Different mission segments are characterized by different mission profiles, including flight paths in three dimensions, which can be informed by the physical context of the mission. For example, altitude and flight trajectory can be informed by the building density and presence of sensitive infrastructure in the vicinity of a base location or pickup/delivery location. Similarly, navigation through an urban landscape (e.g., in an around high-rise structures) can implicate a route for a UAV that differs from shortest-distance pathing (e.g., being restricted in some cases to the airspace above public rights of way) and can also impose constraints on altitude, ascent and descent, radio communication, or the like, making precise navigation important.

When underway, a UAV typically estimates or determines its position using the Global Navigation Satellite System (GNSS), as would be done in terrestrial applications. Unlike typical terrestrial applications, however, UAVs present several atypical challenges to precise position estimation using GPS, including: (i) the imposition of a GPS-exclusion zone near the surface of the earth within which GNSS GNSS signals are invalid; (ii) position error introduced by reflections of GNSS signals by nearby structures and/or the earth's surface; and (iii) dynamic environmental factors including wind gusts that can suddenly affect a UAVs position in three dimensions on or near the timescale for refreshing GNSS position data. For at least these reasons, a UAV can be configured with redundant positioning system (s) to validate GNSS data.

One existing technique for estimating or determining a three-dimensional position of a UAV without reference to GNSS involves the use of geofiducials. The term "geofiducial" in this context refers to a calibrated geographical reference that can be positioned in or around a nest for which the precise location and orientation on the surface of the earth is known. An example that uses visual patterns to encode a precise location, orientation, and identity of the geofiducial is an "AprilTag" as developed by the APRIL robotics lab at the University of Michigan. Reference to one or more geofiducials can be used to precisely locate a UAV, where the UAV is configured to detect and decode the information encoded in the geofiducial.

Precise position and orientation information for geofiducials relies on surveying the vicinity of the nest and the specific locations of each geofiducial. Understandably, surveying with high precision depends on the availability of skilled surveyors and represents an impediment to rapid and scalable expansion of UAV networks to new base locations, prevents establishing temporary base locations, and prevents UAV missions into rural or remote areas without surveyed landing sites. There is a need, therefore, for systems and methods for validating GNSS position of UAVs without reference to geofiducials.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Figure 1A:
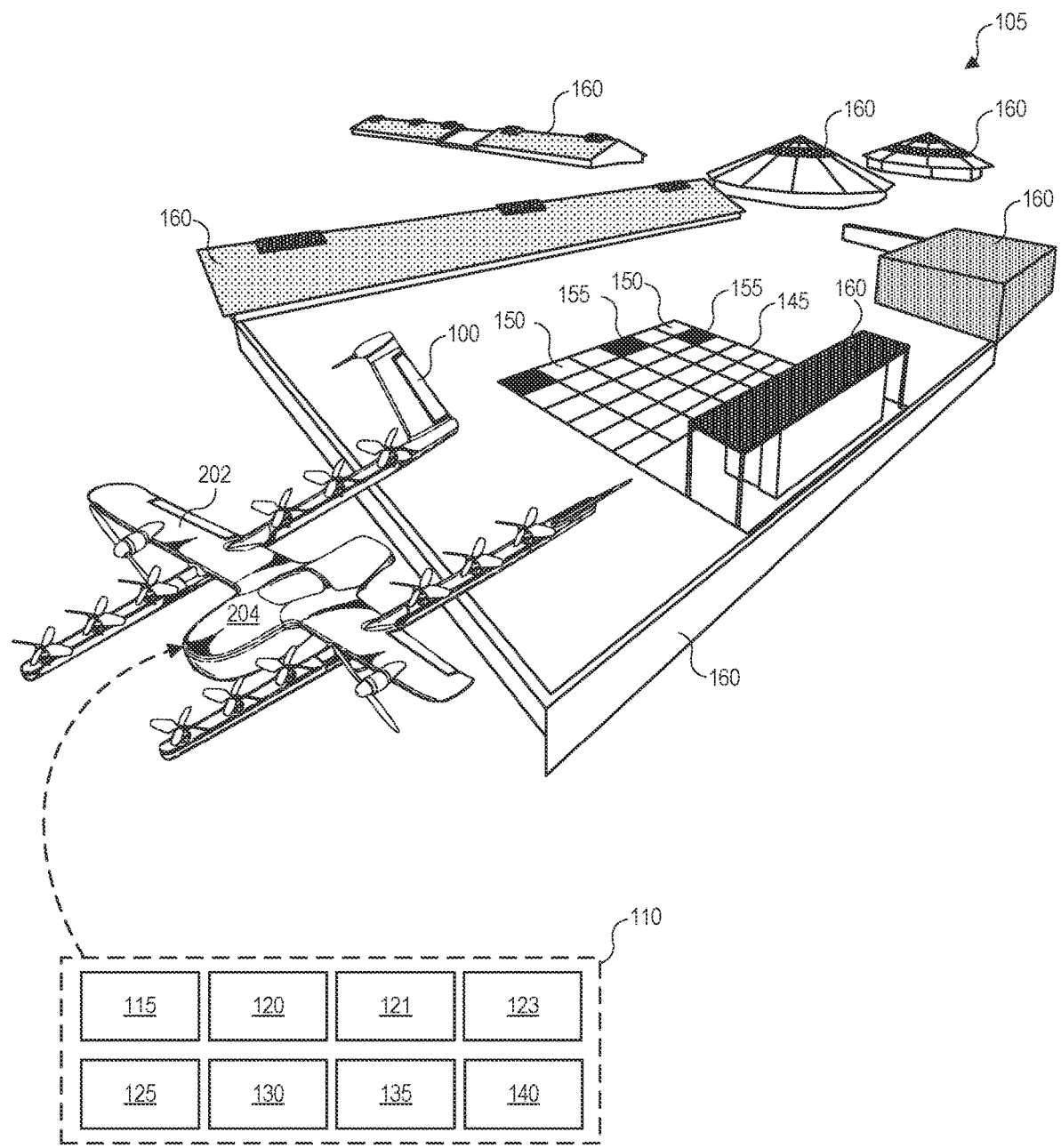
FIG. 1A is a schematic diagram illustrating an unmanned aerial vehicle (UAV) departing from a nest, in accordance with embodiments of the present disclosure.

Embodiments of a system, apparatus, and method validating Global Navigation Satellite System (GNSS) position signals of unmanned aerial vehicles (UAVs) without reference to geofiducials are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some embodiments, multiple redundant systems are employed to estimate and/or determine a position of an apparatus or vehicle, such as an autonomous vehicle (AV). In this context, estimating and determining refer to levels of confidence in the accuracy of an estimate of a position, where an estimated position is characterized by a larger confidence interval than a determined position. It is understood however, that "determining" a visual position and/or a GNSS position does not refer to an absolute or deterministic result, but rather is also based on an estimate that is relatively more likely to be accurate. To that end, operations described as "determining" the position of an object are understood as generating an estimate of the position that is characterized by a probability of accuracy that satisfies internal sensor criteria for error.

For unmanned aerial vehicles (UAVs), a typical mission will include a single departure from a base location, referred to as a nest when the base location includes multiple pads for UAVs to charge between missions, to a single return to the base location or a single arrival to a different location that may include multiple stops at one or more locations. Different mission segments of an overall mission are characterized by different mission profiles, including flight paths in three dimensions, which can be informed by the physical context of the mission. For example, altitude and flight trajectory can be informed by the building density and presence of sensitive infrastructure in the vicinity of a base location or other stopping points. Similarly, navigation through an urban landscape (e.g., in and around high-rise structures) can implicate a route for a UAV that differs from shortest-distance pathing and can also impose constraints on altitude, ascent and descent, radio communication, or the like, making precise navigation important.

In another example, UAV traffic volume around a base location (e.g., a nest) can impose similar constraints on flight trajectory into and out of the airspace of the base location. For example, while UAVs can be configured for horizontal takeoff and landing as well as vertical takeoff and landing, traffic controls imposed at a base location can constrain a UAV to a precise altitude and position prior to initiating a descent. Similarly, a UAV can be constrained to a precise path out of a base location when setting off on a mission.

When underway, a UAV typically estimates or determines its position using the GNSS system, as would be done in terrestrial applications. Unlike typical terrestrial applications, however, UAVs present several atypical challenges to precise position estimation using GPS, including: (i) the imposition of a GPS-exclusion zone near the surface of the earth within which GNSS signals are invalid; (ii) position error introduced by reflections of GNSS signals by nearby structures and/or the earth's surface; and (iii) dynamic environmental factors including wind gusts that can suddenly affect a UAVs position in three dimensions on or near the timescale for refreshing GNSS position data. For at least these reasons, a UAV can be configured with redundant positioning system(s) to validate GNSS data.

One existing technique for estimating or determining a three-dimensional position of a UAV without reference to GNSS includes the use of geofiducials. The term "geofiducial" in this context refers to a calibrated geographical reference positioned in or around a nest for which the precise location and orientation on the surface of the earth is known. An example that uses visual patterns to encode a precise location, orientation, and identity of the geofiducial is an "AprilTag" as developed by the APRIL robotics lab at the University of Michigan. Advantageously, reference to one or more geofiducials can be used to precisely locate a UAV, where the UAV is configured to recognize and decode the information encoded in the geofiducial using images of the earth's surface taken during approach to a nest or during climb from a nest.

Precise position and orientation information for geofiducials relies on surveying the vicinity of the nest as well as the specific locations of each geofiducial. Understandably, surveying with high precision depends on skilled surveyors using complex equipment. This reliance on skilled surveyors represents an impediment to rapid and scalable expansion of UAV networks to new base locations, prevents establishing temporary base locations, and prevents UAV missions into rural or remote areas without surveyed landing sites. There is a need, therefore, for systems and methods for validating GNSS position without reference to geofiducials that is adapted to the atypical constraints imposed by UAV applications.

In the embodiments described herein, a UAV can implement one or more techniques for visual localization in a vicinity of a base location and/or a pickup/delivery location. In this context, the term "visual localization" refers to application of computer vision, laser-based, and/or image processing techniques to determine a position and/or an orientation of a UAV in three dimensions using data generated by sensors onboard the UAV. In this way, visual localization can be used to generate a position estimate to validate GNSS data for the UAV. Visual localization algorithms can reference labeled map data for one or more landmarks in the vicinity of a location, from which a UAV can determine its position and orientation relative to the landmarks. In turn, the position of the UAV generated using visual localization can be compared to the GNSS position as an approach to validating GNSS data without reference to geofiducials.

Visual localization for validation of GNSS data also improves the performance of UAV systems in addition to improving the reach of UAV networks and in dense nests of landing pads. For example, in a base location including tens or hundreds of pads, each pad is typically identified by one or more unique geofiducials. UAVs use computer vision routines to detect, recognize, and decode geofiducials corresponding to an unoccupied landing pad from among the multiple other similarly sized and oriented geofiducials of neighboring pads. Geofiducials can be obscured and/or go undetected when in shadow. As a result, multiple redundant geofiducials are typically placed in an area of the nest to improve visual localization over the course of a day, but partly cloudy weather can affect the quality of visual detection at any time. Further, geofiducials can be generated from a limited set, for example, where the geofiducials are visual patterns that encode data as a pattern of binary pixels. In such cases, the number of unique patterns is limited by the number of pixels in an image (e.g., 2N combinations, of which at least some may be unmeaningful). Limits on the number of geofiducials that can be present in a nest in turn limits the size of the nest. finally, geofiducials, being physical patterns that are either printed or constructed using paints or pigments, can degrade over time in response to weather and/or ultraviolet light exposure. Damaged geofiducials are replaced with an identical pattern or the map is updated to use a new pattern, which represents an ongoing maintenance responsibility not only each time pads are added, but also to maintain existing pads.

In this context, detection refers to one or more computer vision processes that permit a computer to segment an image into a region corresponding to a geofiducial, while recognition refers to the computer vision process(es) attributing some identifier information to the detected geofiducial, such as attributing the detected geofiducial to a particular landing pad. In some cases, detection and recognition can represent constituent processes of a single computer vision algorithm, for example, where a model is trained and/or configured to recognize geofiducials without prior segmentation into regions corresponding to geofiducials and pads.

In base locations where landing pads are arranged in regular arrays, detection and recognition operations without geofiducials can be error prone, slowing down approaches into the base location and increasing risk of collision in locations with high traffic volume. Advantageously, visual localization done in reference to labeled map data benefits from nonuniformity in the visual landscape surrounding a base location to improve position and orientation estimates by referencing landmarks around the base location, increasing the range from the base location at which localization can be accomplished, which permits faster approaches and departures into dense base locations and into areas without geofiducials.

FIG. 1A illustrates an example unmanned aerial vehicle (UAV) 100 including an example GNSS validation system 110, in accordance with an embodiment of the disclosure. Example system 110 includes one or more sensors 115, one or more computer-readable storage media 120, circuitry 125, one or more altitude sensors 130, acceleration and/or orientation sensors 135, and GNSS receiver(s) 140. The constituent elements of example system 110 can be disposed at multiple places in or on UAV 100, and can be employed for GNSS validation as well as other functions of UAV 100 as part of deployment for missions. For example, acceleration and/or orientation sensors 135, altitude sensor(s) 130, and circuitry 125 can also be used for navigation and flight control (e.g., as part of an avionics system) while UAV 100 is hovering and/or cruising during a mission.

A base station 145 includes multiple landing and/or charging pads, including unoccupied pads 150 and occupied pads 155. A vicinity 105 of base station 145 includes multiple landmarks 160 that can be used as points of reference for UAV 100 during localization using sensor(s) 115. In the illustrated example in FIG. 1A, landmarks 160 include structures in vicinity 105 that include edges and materials that can be detected, recognized, and/or identified as part of estimating or determining a position of UAV 100 in three dimensions. While embodiments of the present disclosure focus on detection and/or recognition of visible landmarks 160, embodiments also include landmarks 160 that use additional and/or alternative spectra for localization. For example landmarks 160 can include radio-wave sources, directed ultrasound (e.g., phased array ultrasound transmitters), or other generators of transitory signals that can encode information useable by UAV 100 to triangulate or otherwise determine a position. In some embodiments, landmarks 160 can be or include portions of structures, signage, natural features (e.g., trees, hedges, rock faces, etc), roads or tracks, or other features of vicinity 105 that can be detected and recognized using computer vision.

In this way, example system 110 can be configured to generate image data including images of vicinity 105, generate GNSS data using GNSS receiver(s) 140, and process image data using circuitry 125 to detect and/or recognize one or more landmarks 160 in vicinity 105 as part of validating a GNSS position of UAV 100. In some embodiments, components of example system 110 are disposed in and/or at least partially incorporated into a fuselage 204 or a wing 202 of UAV 100 (described in reference to FIG. 2A). To that end, at least some components of example system 110 can be disposed in a forward section of fuselage 204, while other components can be disposed in an aft section of fuselage 204. In some embodiments, image sensor(s) 115 are disposed on an underside of wing 202 using a vibration-isolated gimble or other mounting system, providing a field of view (FOV) that includes the ground beneath UAV 100.

Figure 2A:
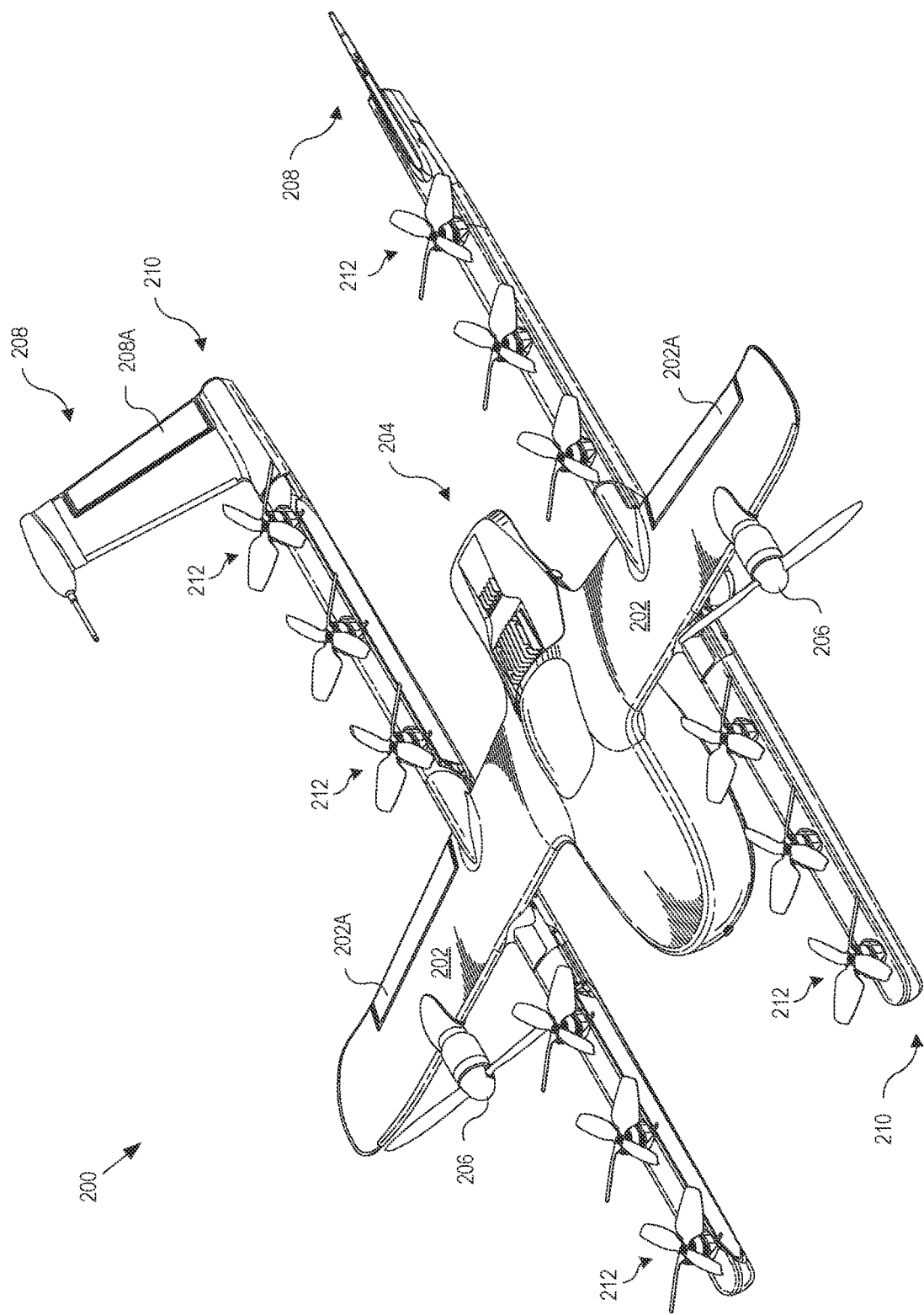
FIGS. 2A and 2B illustrate an example UAV, in accordance with embodiments of the present disclosure.
Figure 2B:
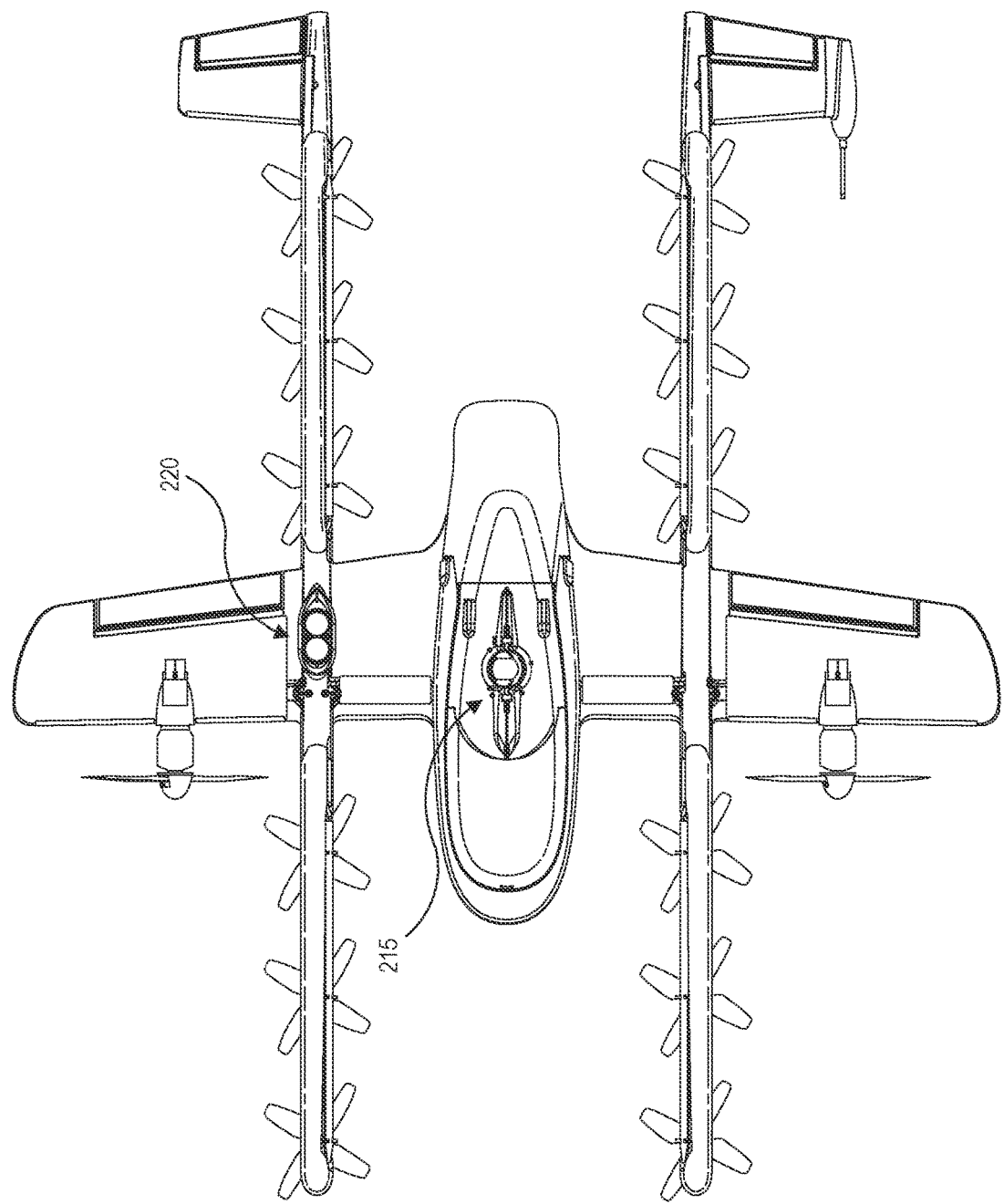

As described in reference to FIGS. 2A-2B, sensor(s) 115 can be or include one or more cameras, LIDAR systems, ground-facing radar systems, range-finding sensors, as well as optical systems for scanning, searching, expanding, magnifying, or tracking objects in the FOV of sensor(s) 115. As such, sensor(s) 115 can be positioned at multiple points in fuselage 204 and/or wing 202. For example, a LIDAR system, which can include a rotating laser source, can be mounted in such a way that the momentum transferred to UAV 100 can be at least partially compensated using the rotors and/or propellers that drive UAV 100.

Computer-readable storage media 120 can be or include solid state memory or other non-transitory forms of data storage that are compatible with implementation in UAVs. For example, UAV applications can experience dynamic g-forces during ascent and descent, can experience vibration during hover and cruise, and can undergo temperature swings as a function of altitude. For at least these reasons, media 120 are configured using technologies that are relatively insensitive to vibration, acceleration, and high or low temperatures (e.g., above 50° C. and below 0° C.).

Figure 3:
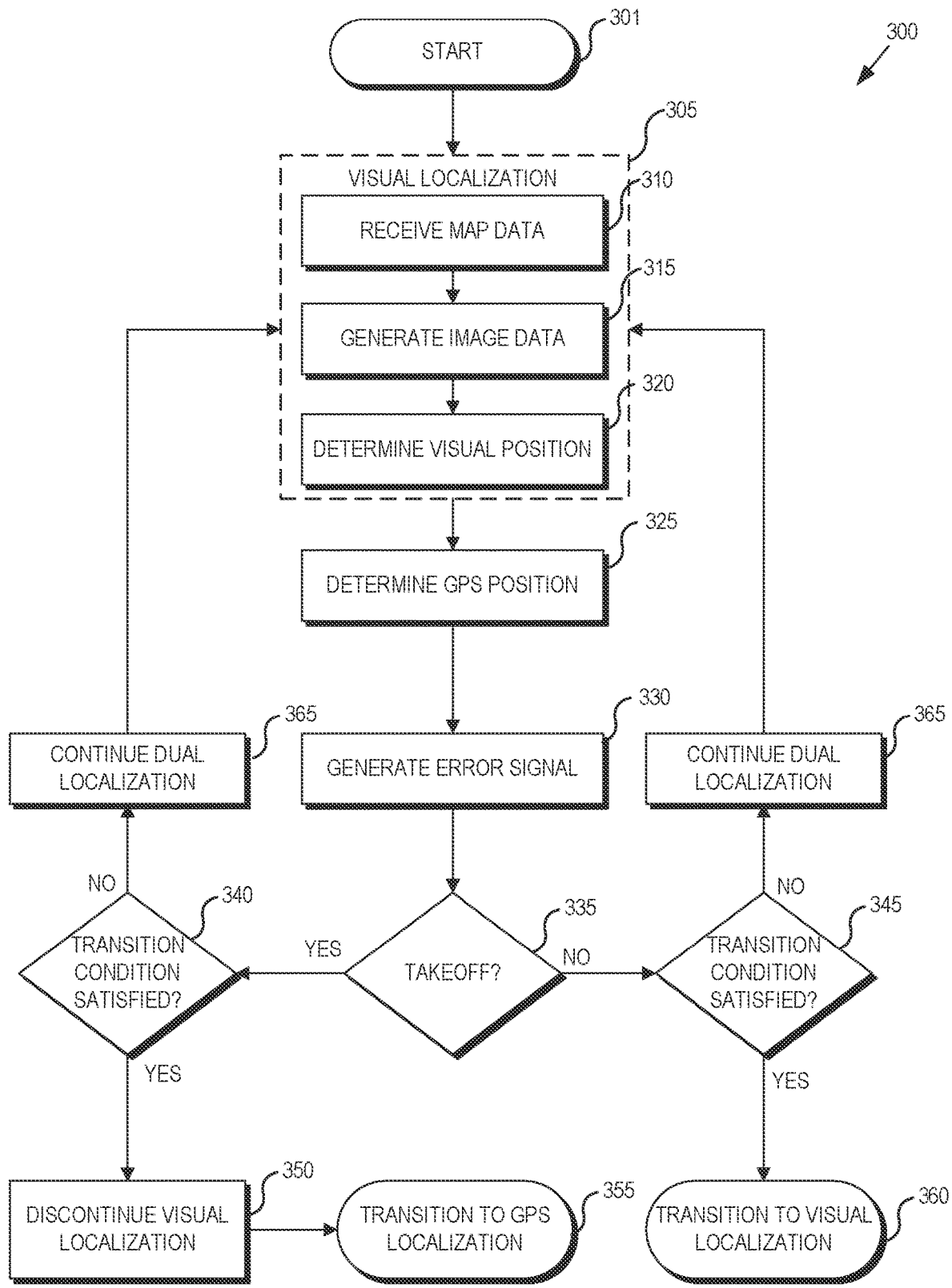
FIG. 3 is a flow chart illustrating an example process for validating a GNSS position signal of a UAV without reference to geofiducials, in accordance with embodiments of the present disclosure.
Figure 4A:
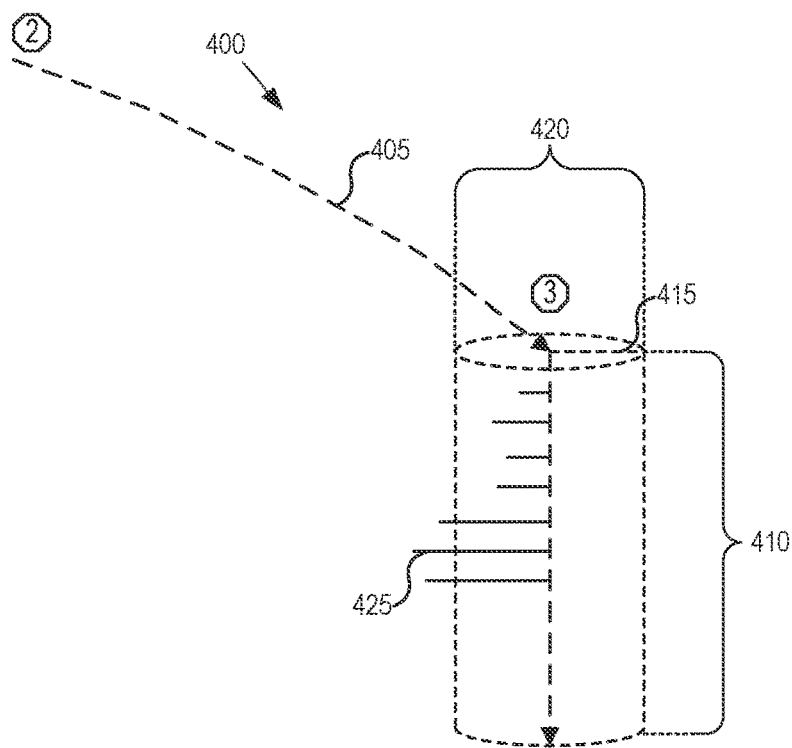
FIG. 4A is a schematic diagram illustrating an example validation technique employing an error signal for vertical descent of a UAV into a nest, in accordance with embodiments of the present disclosure.
Figure 4B:
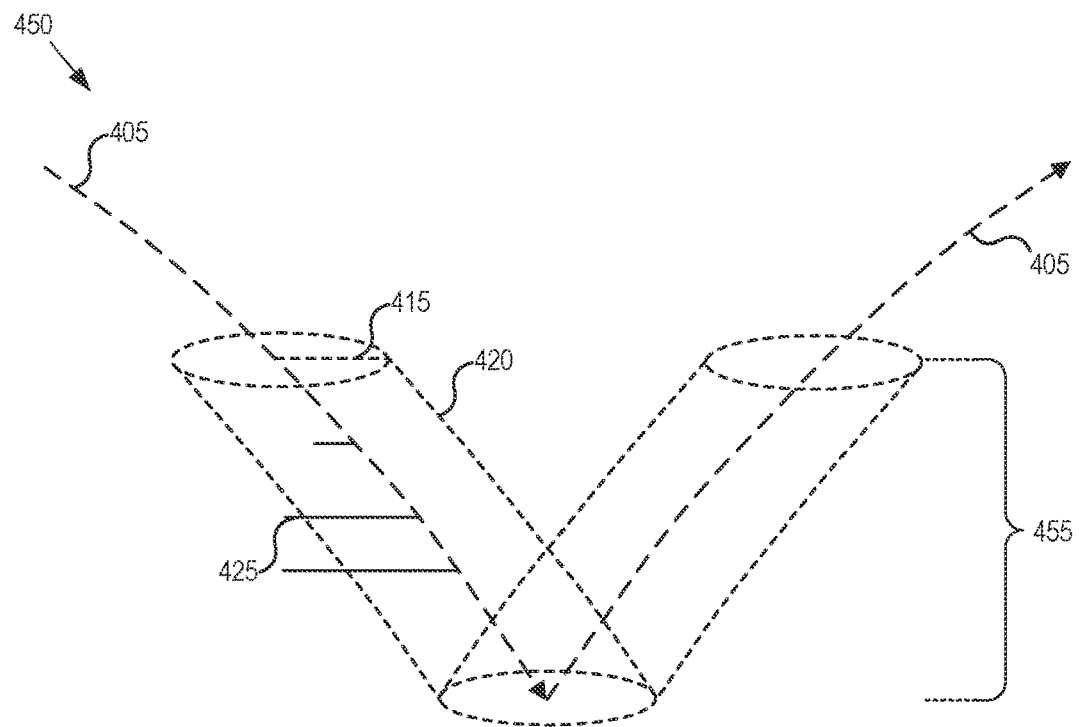
FIG. 4B is a schematic diagram illustrating an example validation technique employing an error signal for vertical descent of a UAV into a nest, in accordance with embodiments of the present disclosure.
Figure 5:
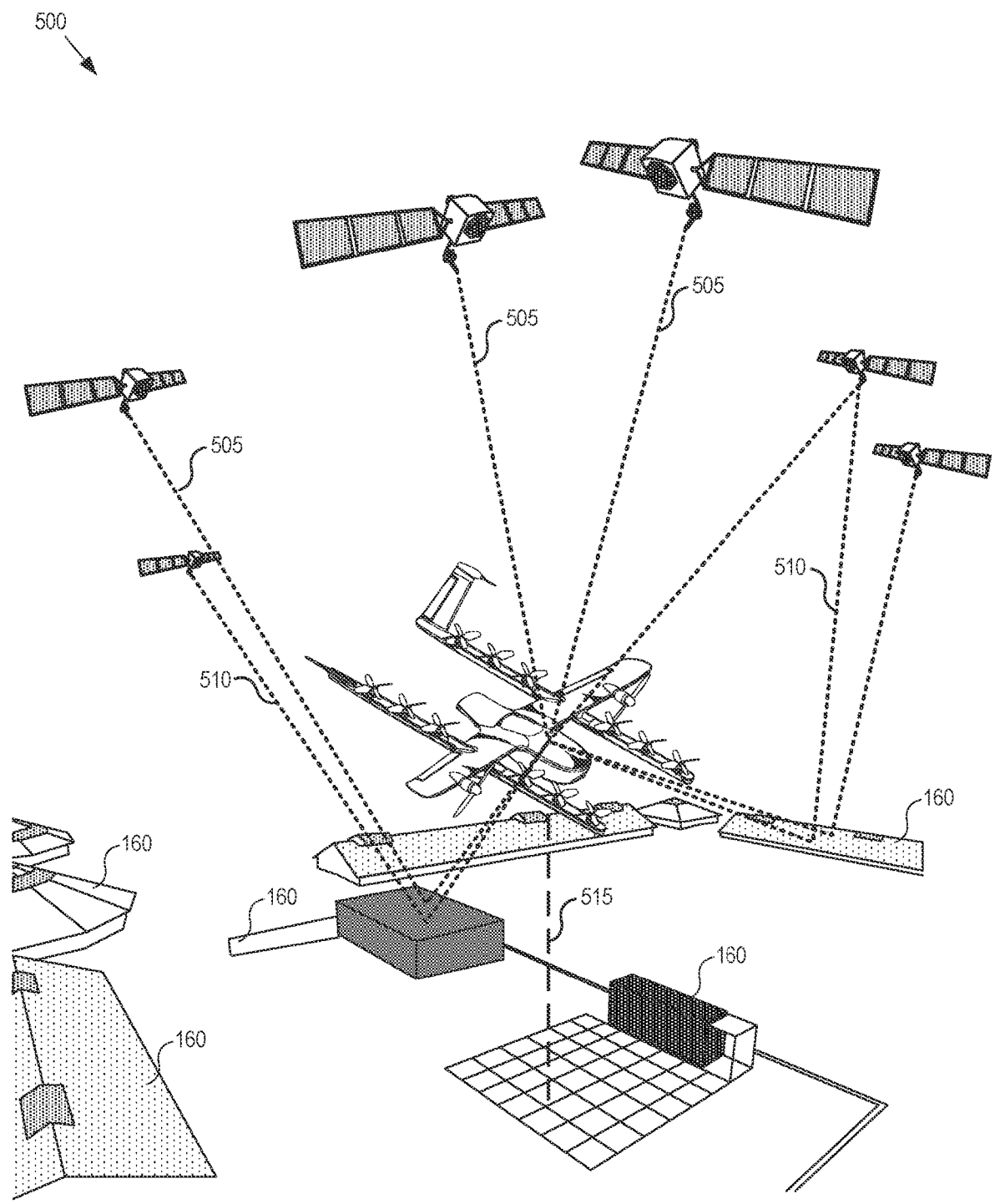
FIG. 5 is a schematic diagram illustrating an example technique for validating a position of a UAV without reference to geo-fiducials using a parity-space technique, in accordance with embodiments of the disclosure.

Media 120 can store computer-executable instructions 121 that permit UAV to implement one or more visual localization routines and GNSS validation techniques, as described in more detail in reference to FIGS. 3-5. In this context, computer-executable instructions 121 can be or include software stored as computer-readable code but can also be or include physically encoded logic in an application specific integrated circuit ("ASIC") as part of circuitry 125. In this way, execution of the various operations and routines included as part of UAV localization can be shared across different components of example system 110, with some operations including access/storage of data and encoded instructions using media 120 and other operations being implemented using circuitry 125 configured for the task.

As described in more detail in reference to FIG. 3, localization routines making use of images generated by sensor(s) 115 can include visual positioning system (VPS) and/or semantic visual localization approaches, among other techniques making use of labeled map data of vicinity 105 including landmarks 160. VPS and semantic visual localization can describe various approaches including rules-based models, trained machine learning models 123, and/or other forms of artificial intelligence that are configured to assess a similarity between an image of vicinity 105 and labeled map data describing landmarks 160 as part of a numerical representation of vicinity 105 (e.g., as map data stored in media 120). Media 120 can store computer readable instructions 121 as well as trained models 123 that are configured to input image data and map data and to estimate or determine a position of UAV 100 in reference to landmarks 160. In this way, UAV 100 can reference visual information in vicinity 105 during a mission rather than relying on geofiducials for localization.

Figure 1B:
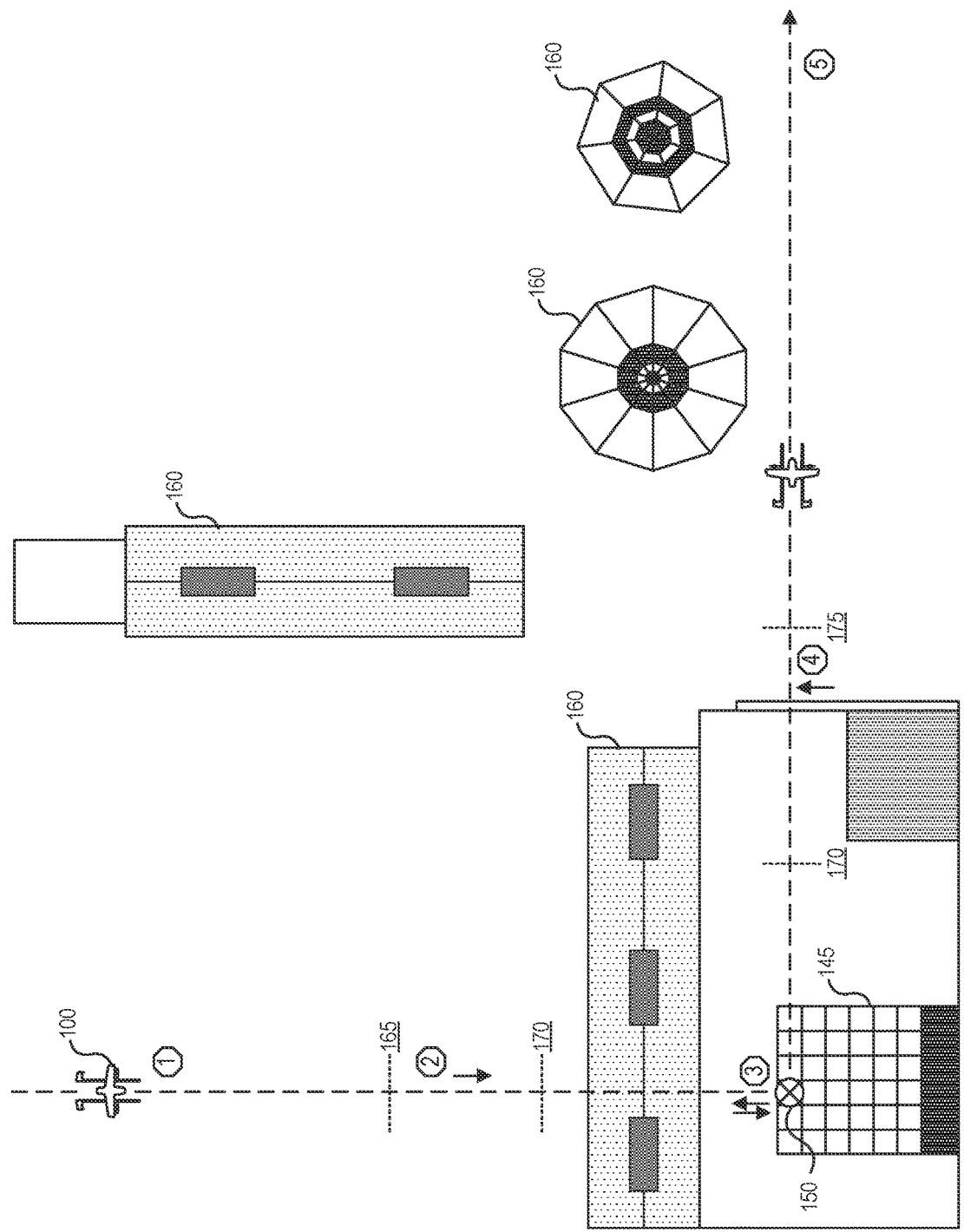
FIG. 1B is a schematic diagram of an example UAV mission having multiple mission segments including a descent into the nest of FIG. 1A and an ascent from the nest, in accordance with embodiments of the present disclosure.

FIG. 1B is a schematic diagram of an example UAV mission having multiple mission segments including a descent into the nest of FIG. 1A and an ascent from the nest, in accordance with embodiments of the present disclosure. In the illustrated embodiment, UAV 100 has a mission wherein it approaches a nest location 145 in horizontal flight (mission segment 1: approach), continues the approach while descending below a threshold altitude 165 at which GNSS position data is presumed to be invalid (mission segment 2: descent), and identifies an unoccupied pad 150 to descend and land (mission segment 3: landing). UAV 100 can remain at nest location 145 until it receives mission data, during which time onboard batteries can charge or maintenance can be undertaken. From nest location 145, UAV 100 can continue the mission (or undertake a second mission) by vertically taking off from the landing pad and ascending above threshold altitude 165 (mission segment 4: takeoff and ascent), continuing to a destination that can be or include a pickup location, a delivery location, or another nest location 145, (mission segment 5: departure). In some embodiments, the mission segments shown in FIG. 4B constitute a portion of a single mission, such that segments 1-3 follow segments 4 and 5 in time, for example, where UAV 100 is based at nest location 145, and a mission concludes with UAV 100 returning to nest location 145.

Between mission segment 2 and mission segment 3, UAV 100 does not rely on GNSS data to determine its position, but rather employs visual localization or other techniques to estimate or determine its position, as described in more detail in reference to FIGS. 3-5. While a pre-defined threshold altitude 165 represents one approach for defining a point at which GNSS data is presumed invalid (also referred to as a "GNSS denied zone" around nest location 145), in some embodiments, dynamic techniques are employed to improve localization in conditions and/or locations for which GNSS data can be more error prone. In this way, threshold altitude 165 for transitioning from GNSS to localization routines for determining the position of UAV can differ from a minimum altitude 170 that can be predefined for UAV 100 and/or nest location 145. In an illustrative example, minimum altitude 170 can be about 20 m, about 30 m, about 40 m, about 50 m, about 60 m, or greater, including fractions and interpolations thereof, while threshold altitude 165 and/or 175 can be greater than minimum altitude 170 based at least in part on the available of a valid visual position.

For example, in areas in which GNSS signals are more likely to reflect against surfaces (e.g., in an "urban canyon" environment), GNSS data can include greater error and the altitude at which GNSS data is considered invalid can increase, relative to a nest location 145 for which relatively few structures or other conditions interfere with GNSS data. To that end, threshold altitude 165 for the GNSS denied zone itself can also vary from one location to another, based at least in part on the nature of vicinity 105. In some embodiments, UAV 100 determines whether GNSS data is valid between mission segment 1 and mission segment 2, using techniques described in more detail in reference to FIG. 3. In an illustrative example, on approach to nest location 145, UAV 100 can initialize visual localization routines of example system 110, allowing UAV 100 to detect and/or recognize landmarks 160. In reference to relative positions, orientations, and/or features of landmarks 160, example system 110 can generate a visual position of UAV 100 that can be used to assess error in GNSS data and determine whether GNSS data is invalid prior to reaching threshold altitude 165.

Between mission segment 3 and mission segment 4, UAV 100 relies on example system 110 for localization without reference to GNSS data, which is presumed to be invalid while UAV 100 is in the GNSS denied zone below minimum altitude 170 and/or transition threshold altitude 165. GNSS receiver 140, however, can continue communicating with the GNSS system and can continue generating GNSS data, despite the presumption that error near the surface of the earth makes the GNSS position inaccurate. When UAV 100 ascending out of the GNSS denied zone, GNSS data is validated using visual position data, as described in more detail in reference to FIGS. 3-5. In some cases, GNSS data validation includes generating an error signal that is based at least in part on determining an extent of agreement/disagreement between GNSS data and visual position data. At a transition threshold altitude 175 for ascent, which can be the same altitude as threshold altitude 165, UAV transitions from visual localization or other localization techniques to GNSS data and continues its mission, discontinuing the use of example system 110 for localization. In some embodiments, UAV 100 transitions from visual localization or other localization techniques if the error signal satisfies a transition condition, for example, where the GNSS data accurately describes the geographical location of UAV 100 above threshold altitude 175. In some embodiments, UAV 100 returns to an unoccupied pad 150 at nest location 145 where the error signal fails to satisfy the transition condition, for example, where the GNSS data inaccurately describes the geographical location of UAV 100 above threshold altitude 175.

In some embodiments, transitioning from visual localization to GNSS localization is undertaken during vertical ascent/descent as part of mission segment 3. Temporal variability in visual position data and/or GNSS data can render one or both sources of positional information unreliable. To that end, a transition condition for GNSS validation can include a temporal component, where the transition condition permits UAV 100 to discontinue visual localization and use GNSS data for localization when error and temporal variability elements are satisfied (e.g., a Boolean AND condition). In the context of mission segment 3, UAV 100 can assume a hover position as part of vertical landing and/or take off at or near transition altitude 165, such that the variation of position data over time can be assessed.

In some embodiments, variation of GNSS data and/or visual localization data in time above a context-specific threshold precludes the transition from visual localization to GNSS localization. In this context, the term "context-specific threshold" refers to a threshold for variance in GNSS position information and/or visual position information (e.g., based at least in part on recognition of landmarks 160) that can vary between different UAV 100 configurations, different base locations 145 or pickup/delivery locations, different UAV traffic volumes, different ambient conditions, or the like. In an illustrative example, a contextual threshold for temporal dynamics in positional data can be more tolerant in locations with lower air traffic volume, lower population density, or fewer restrictions on flight paths (e.g., airspace restrictions around airports or in urban areas). In contrast, a contextual threshold for temporal dynamics in positional data can be less tolerant in locations with higher air traffic volume, higher population density, or greater restrictions on flight paths.

FIGS. 2A and 2B illustrate an UAV 200 that is configured for various types of UAV missions including package delivery, aerial photography, public safety, or otherwise, in accordance with an embodiment of the disclosure. FIG. 2A is a topside perspective view illustration of UAV 200 while FIG. 2B is a bottom side plan view illustration of the same. UAV 200 is one possible implementation of UAV 100 illustrated in FIG. 1, although other types of UAVs may be implemented as well.

The illustrated embodiment of UAV 200 is a vertical takeoff and landing (VTOL) UAV that includes separate propulsion units 206 and 212 for providing horizontal and vertical propulsion, respectively. UAV 200 is a fixed-wing aerial vehicle, which as the name implies, has a wing assembly 202 that can generate lift based on the wing shape and the vehicle's forward airspeed when propelled horizontally by propulsion units 206. The illustrated embodiment of UAV 200 has an airframe that includes a fuselage 204 and wing assembly 202. In one embodiment, fuselage 204 is modular and includes a battery module, an avionics module, a mission payload module, and a sensor module. These modules are secured together to form the fuselage or main body.

The battery module (e.g., fore portion of fuselage 204) includes a cavity for housing one or more batteries for powering UAV 200. The avionics module (e.g., aft portion of fuselage 204) houses flight control circuitry of UAV 200, which may include a processor and memory (e.g., circuitry 125 and media 120 of FIG. 1A), communication electronics and antennas (e.g., cellular transceiver, wife transceiver, etc.), and various sensors (e.g., global positioning sensor, an inertial measurement unit, a magnetic compass, a radio frequency identifier reader, etc.). The mission payload module (e.g., middle portion of fuselage 204) houses equipment associated with a mission of UAV 200. For example, the mission payload module may include a payload actuator 215 (see FIG. 2B) for holding and releasing an externally attached payload (e.g., package for delivery). In some embodiments, the sensor module may include camera/sensor equipment (e.g., camera, lenses, radar, lidar, pollution monitoring sensors, weather monitoring sensors, scanners, etc.). In FIG. 2B, an onboard camera 220 is mounted to the underside of UAV 200 to support a computer vision system for visual localization, visual odometry, GNSS validation, and/or optical code processing for reading visual codes affixed to packages (e.g., barcodes, QR codes, alphanumeric information, etc.).

As illustrated, UAV 200 includes horizontal propulsion units 206 positioned on wing assembly 202 for propelling UAV 200 horizontally. UAV 200 further includes two boom assemblies 210 that secure to wing assembly 202. Vertical propulsion units 212 are mounted to boom assemblies 210. Vertical propulsion units 212 providing vertical propulsion. Vertical propulsion units 212 may be used during a hover mode where UAV 200 is descending (e.g., to a delivery location), ascending (e.g., at initial launch or following a delivery), or maintaining a constant altitude. Stabilizers 208 (or tails) may be included with UAV 200 to control pitch and stabilize the aerial vehicle's yaw (left or right turns) during cruise. In some embodiments, during cruise mode vertical propulsion units 212 are disabled or powered low and during hover mode horizontal propulsion units 206 are disabled or powered low.

During flight, UAV 200 may control the direction and/or speed of its movement by controlling its pitch, roll, yaw, and/or altitude. Thrust from horizontal propulsion units 206 is used to control air speed. For example, the stabilizers 208 may include one or more rudders 208a for controlling the aerial vehicle's yaw, and wing assembly 202 may include elevators for controlling the aerial vehicle's pitch and/or ailerons 202a for controlling the aerial vehicle's roll. As another example, increasing or decreasing the speed of all the propeller blades simultaneously can result in UAV 200 increasing or decreasing its altitude, respectively.

Many variations on the illustrated fixed-wing aerial vehicle are possible. For instance, aerial vehicles with more wings (e.g., an "x-wing" configuration with four wings), are also possible. Although FIGS. 2A and 2B illustrate one wing assembly 202, two boom assemblies 210, two horizontal propulsion units 206, and six vertical propulsion units 212 per boom assembly 210, it should be appreciated that other variants of UAV 200 may be implemented with more or fewer of such components.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

FIG. 3 is a flow chart illustrating an example process 300 for validating a GNSS position signal of a UAV without reference to geofiducials, in accordance with embodiments of the present disclosure. Example process 300 is described with reference to GNSS validation system 110 as an example of techniques used to validate GNSS data during a mission undertaken by UAV 100 at or around threshold altitude 165 or 170, as described in more detail in reference to FIGS. 1A-1B. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel. In some embodiments, process 300 can include one or more optional process blocks, some process blocks can be omitted, and/or some process blocks can be repeated. Advantageously, operations 305-365 of example process 300 can be prioritized, parallelized, distributed, or otherwise coordinated to facilitate transition from visual localization to GNSS localization, being informed, for example, by the temporal sensitivity of the data being generated. In this way, the performance of UAV systems including UAV 100 with example system 110 can be improved over those relying on geofiducials for GNSS validation.

At process block 301, example process 300 includes an initialization process during which example system 110 begins visual localization 305 operations. In some embodiments, initialization of visual localization 305 includes one or more sub-processes that include physical movement of UAV 100 and/or computational processes involving sensor (s) 115 and/or image processing. For example, for takeoff of UAV 100, initialization can include UAV 100 ascending to a distance above the ground of about 0.5 m, about 1 m, about 2 m, about 3 m, about 4 m, about 5 m, including fractions and interpolations thereof, where the term "about" refers to a distance of ±10% of the stated value. At the preliminary altitude, visual localization 305 can be initialized, which can include capturing images of vicinity 105 in the FOV of sensor(s) 115 that can be generated at a relatively higher resolution than those used in subsequent visual localization 305 operations of example process 300. Similarly, initialization can include calibration of image sensors and/or inertial measurement sensors (e.g., accelerometers, gyroscopes, etc.), which can include completing one or more prescribed motions using systems of UAV 100.

Additionally and/or alternatively, operation 301 can include undertaking a mission in line with mission data that can be received by UAV 100 as part of UAV network operation. Example process 300 can be preceded by UAV 100 being activated or otherwise addressed by a mission control system that identifies and routes UAV 100 (e.g., as part of an autonomous delivery and/or logistical network). In this way, operation 301 can be triggered as a mission is assigned to UAV 100.

In some embodiments, timing of operation 301 corresponds with arrival of UAV 100 in the vicinity of a destination (e.g., vicinity 105 of FIG. 1A). The destination can be base station 145 (e.g., corresponding to the end of a mission), can be an intermediate stop on a mission that can include one or more stops, and/or can be a second base station that is different from the base station where UAV 100 started its mission (e.g., as part of a relocation of UAV 100). In an illustrative example, operation 301 can be initiated when UAV 100 begins its descent into the area of base station 145 (e.g., mission segment 1 of FIG. 1B). In this way, UAV 100 can be in motion and at an altitude above threshold altitude 165 when example process 300 begins, such that GNSS data can be valid. As described in reference to FIGS. 1A-1B, constituent operations of example process 300 can permit UAV 100 to validate visual localization 305 routines while GNSS data is valid (e.g., by comparing GNSS data with visualization data, or by monitoring temporal variation of position information) as part of a transition condition that, when satisfied, allows UAV 100 to transition from GNSS localization to visual localization.

Operations 310-320 of example process 300 are included as part of visual localization 305. Visual localization 305 can include determining a position of UAV 100 using image data that is generated using images of vicinity 105. Various approaches can be taken as part of visual localization 305 that inform the type(s) of reference data used for visual localization and the type(s) processing applied to images. The result of visual localization routines is a position estimate of UAV 100. In some embodiments, example process 300 can omit some operations of visual localization 305. For example, iterations of visual localization 305 can omit receiving map data where map data is already stored in media 120.

It is understood that numerous visual localization techniques are available, such as structure-based techniques, image retrieval techniques, scene point regression techniques, absolute pose regression techniques, pose interpolation techniques, and relative pose estimation techniques. Such techniques generally involve three major stages each including multiple sub operations. For example, visual localization 305 can include a feature extraction and image pairing stage, a matching stage, and a pose computation stage. The inputs to the process can include test images and reference images, for example, images of vicinity 105 generated by sensor(s) 115 and data for landmarks 160 (e.g., a searchable index of features, labeled images, point-cloud data, etc.).

Feature extraction and image pairing can include local and/or global feature extraction operations and pairing operations including brute force pairing and/or similarity-based pairing. Matching can include operations for scene point regression that leverage 3D map data and/or reference poses, as well as 2D-3D feature matching that uses 3D map data to match landmarks 160 observed by UAV 100 with those in map data. Pose computation can include various techniques for estimating a location of UAV relative to landmarks, from which a visual position of UAV can be determined. Different techniques are characterized by different levels of performance that are based at least in part on the size of vicinity 105, temporal factors (e.g., for which traffic volume is a factor), and the computational resources available as part of example system 110. For example, while structure-based techniques with image retrieval provide improved speed and robustness for large environments, the accuracy of visual localization 305 depends at least in part on the volume and quality of reference data (referred to as map data) that are available.

At operation 310, example process 300 includes receiving map data. Map data, as described in reference to FIG. 1, can be or include a numerical representation of vicinity 105 including data describing landmarks 160 and/or features of landmarks 160 in vicinity 105. To that end, UAV 100 can receive map data that is structured as a searchable database of visual features (e.g., as part of a visual positioning service (VPS) approach), as one or more labeled reference images of vicinity 105 including base station 145 and/or landmarks 160 (e.g., as part of a semantic visual localization approach), or in one or more alternative data structures corresponding to inputs for other visual localization techniques.

In some embodiments, map data is received from a database of labeled images and/or feature data (e.g., searchable indices of features) hosted on a remote system, which can be or include a remote server, a local server at base station 145, a distributed computing system (e.g., a cloud network), or the like. In an example, UAV 100 can communicate with the remote system over a network, such as a private network (e.g., intranet) or a public network (e.g., internet), to request map data for base station 145, based at least in part on metadata identifying base station 145. Metadata, in this example, can be or include a unique identifier for base station, which can include geographical coordinates of base station 145, an alphanumeric code unique to base station 145, or the like. In some embodiments, map data is received corresponding to the GNSS position of UAV 100 while UAV 100 is above threshold altitude 165, for example, during a mission segment (e.g., mission segment 1 of FIG. 1B), or in circumstances where UAV 100 is scheduled to pick up or deliver a package at a site other than base station 145 that is not classified with an identifier.

Labeled images can be prepared by classifying aerial images of vicinity 105 on a pixel-wise basis into one or more classes based on type of landmark 160. In an illustrative example, images can be classified manually and/or using a trained or configured model (e.g., a convolutional neural network trained using unsupervised and/or supervised learning to classify pixels into one or more clusters corresponding to landmarks 160 or landmark types). For example, where vicinity 105 is or includes low-density housing, labeled map data can include a segmented image where pixels are attributed to public roadway, private roadway, grass, trees, or houses. Similarly, where vicinity 105 is or includes high-density urban and mixed-use development, labeled map data can include a segmented image where pixels are attributed to public roadway, private roadway, sidewalk, accessible rooftop, and inaccessible rooftop. Labeled data for base station 145 can include pads 150 and 155, ancillary structures, and nearby landmarks 160, contrasted with a background that can include or exclude additional landmarks 160. In this way, labeled images can serve to reduce the depth of information used for semantic localization and reduce computational resource demand of visual localization.

At operation 315, example process 300 includes generating image data using sensor(s) 115 onboard UAV 100. Image data can be or include images of vicinity 105 including at least some, if not all, landmarks 160. Image data can be processed onboard UAV 100 (e.g., using circuitry 125) and or using remote systems in communication with UAV 100 over a network. As with map data described in reference to operation 310, image data can be processed to generate labeled images and/or can be processed to generate a numerical representation of features visible in the FOV of UAV 100, such as the outlines of buildings, signage, position of architectural features, the locations and arrangements of pads 150 and 155, or the like.

Edge-detection, feature recognition, and feature tracking are algorithmic techniques that can be encoded as instructions 121 and or trained models 123 (e.g., a visual descriptor algorithm or model) and performed onboard UAV 100 during autonomous operation with or without communication with a remote system. Examples of edge-detection algorithms that can be used to generate image data can include, but are not limited to, Canny, Kovalevsky, Sobel, or other first order or second order methods. Examples of feature detection algorithms include, but are not limited to FAST, Laplacian of gaussian, difference of gaussians, determinant of hessian, MSER, or other techniques. As described in reference to FIGS. 1A-1B, computer readable media 120 can store models 123 configured to generate image data based at least in part on images generated by sensor(s) 115. In the example of labeled images, example system 110 can generate semantically labeled images by classifying images generated by sensor(s) 115 on a pixelwise basis (e.g., using a trained convolutional neural network model or other model trained to input a camera image and to output a labeled image).

Advantageously, generating image data onboard UAV 100, rather than by communicating images to a remote system for semantic labeling, can improve performance of visual localization by reducing latency introduced by bandwidth limits as well as reducing power demand for wireless data transfer between UAV 100 and the remote system. Additionally, generating image data onboard UAV 100 permits visual localization in areas without a reliable two-way link with a network, such that UAV can transition from GNSS to visual localization (or vice versa) autonomously.

At operation 320, example process 300 includes determining a visual position of UAV 100 using image data generated at operation 315, as part of visual localization 305. As described in more detail in reference to operation 315 and FIG. 1A, image data can be structured in a way corresponding to a given localization technique. For example, visual semantic localization can be implemented by software 121 and/or models 123 that are configured to take in labeled images of vicinity 105. In another example, visual positioning techniques (e.g., VPS) can be implemented using image data formatted as lists of features (e.g., in a table of vectors) that can be identified by searching in a feature index for vicinity 105.

At operation 325, example process 300 includes communicating with the GNSS system (e.g., multiple GNSS satellites) to estimate or determine a three-dimensional position of UAV 100 (e.g., using GNSS receiver 140 of FIG. 1A). In some embodiments, UAV 100 maintains communication with the GNSS system at altitudes where GNSS data is presumed to be invalid, for example, to receive a clock signal from the GNSS system that can be used for internal computational processes that rely on a calibrated clock signal. Further uses of GNSS data are described in reference to FIGS. 4A-5.

At operation 330, example process 300 includes generating an error signal describing an error between the visual position of UAV 100 generated by visual localization 305 and the GNSS position of UAV 100 generated using GNSS data collected at operation 320. As described in more detail in reference to FIGS. 4A-5, the error signal can be generated in multiple ways. For example, generating the error signal can include determining an error between the visual position of the UAV and the GNSS position of the UAV. In some embodiments, parity space fault detection techniques, which are sometimes used as part of internal sensor validation of inertial measurement units, are used to detect/identify faults in visual position and/or GNSS position measurements, as described in more detail in reference to FIG. 5. In this context, the term "detect" refers to a determination that one or more measurements are faulty, while "identify" refers to a determination of which of the measurements is faulty. In some embodiments, for example, where measurement redundancy includes two sensors (e.g., visual localization and GNSS localization), parity space fault detection techniques can detect a sensor fault but cannot identify which of the two sensors is faulty. In some embodiments, where measurement redundancy includes more than two sensors, parity space fault detection techniques can identify which of the three or more sensors are faulty.

The error signal can include time-sequence data structured for a corresponding validation technique. For direct error comparison, the error signal can include a time-variant difference between visual position and GNSS position. The error signal can also include higher order information based at least in part on variation in the error signal as a function of time (e.g., first derivative approximations for the average variation in the magnitude as a function of time). In another example, parity space techniques can generate a parity vector as a function of time, a noise estimate, and one or more projections onto coordinate axes in parity space that indicate which sensors are faulty.

At decision block 335, example process 300 includes determining whether UAV is approaching or departing base station 145 or pickup/delivery location. As such, decision block 335 is indicative of one or more Boolean or other logic operations that affect the structure of algorithmic operations of example process 300. Rather than being in an explicit order, decision block 335 is included following operation 330 to illustrate that the outcome of example process 300 can differ based at least in part on what mission segment UAV 100 is undertaking, as described in more detail in reference to FIG. 1B. In this way, decision block 335 could precede operations of visual localization 305, as part of start operations 301, such that example process 300 can include two or more different algorithms that include similar or identical operations for visual localization 305, GNSS localization, and error signal generation. Decision block 335 can include referencing mission data stored in memory 120 (e.g., including flight path information) as well as heading information to determine whether UAV approaching base station 145 and/or a pickup or delivery point or departing therefrom. Further, decision block 335 can be configured as one or more operations to determine whether to transition from GNSS localization to visual localization, or vice versa, based at least in part on a third sensor input (e.g., altitude). In some embodiments, decision block 335 includes geo-fencing routines to determine whether UAV 100 has entered or is entering vicinity 105, as an approach to determining whether UAV is approaching base station 145 or is departing base station 145. To that end, it would be understood that the Boolean outcome of decision block 335 can be based on one or more measures including prescribed mission data (e.g., a priori designation of whether UAV is initiating a takeoff sequence or is already in flight, is approaching a pickup/delivery location or is departing from the location) and/or sensor data to select appropriate transition threshold criteria based at least in part on heading, speed, altitude, or other data.

To that end, decision blocks 340 and 345 represent operations implemented to determine whether it is appropriate for UAV 100 to transition from visual localization to GNSS localization or vice-versa, respectively. For example, where the outcome of decision block 335 indicates that UAV 100 is taking off from base station 145 (e.g., mission segment 3 of FIG. 1B), decision block 340 can include comparing the error signal generated at operation 330 to a transition condition that includes one or more criteria for discontinuing visual localization at operation 350 and transitioning from visual localization to GNSS localization at operation 355. Similarly, where the outcome of decision block 335 indicates that UAV 100 is approaching base station 145 (e.g., mission segment 2 of FIG. 1B), decision block 345 can include comparing the error signal generated at operation 330 to a transition condition that includes one or more criteria for transitioning to visual localization at operation 360 and disregarding GNSS data as a source of valid position information.

Where each respective transition condition is satisfied, example process 300 includes operations for implementing a transition from one modality of localization to the other (e.g., GPS-to-visual or vice-versa). Where each respective transition condition is not satisfied, example process 300 includes operation 365 for continuing dual localization (e.g., GNSS and visual localization in parallel, concurrently, and/or asynchronously) and repeating at least some operations of visual localization 305 and GNSS localization 325. In this way, at least a portion of example process 300 can be iterative, for example, generating an error signal that includes multiple data points in a time sequence, rather than a single instance of each operation.

At decision block 340, a takeoff transition condition is configured to determine whether GNSS data can be validated using visual localization 305, thereby permitting UAV 100 to transition to GNSS localization and to discontinue visual localization operations. Advantageously, transitioning as soon as possible improves performance of UAV 100 by reducing energy demand from batteries, freeing up computational resources, and permitting UAV 100 to leave vicinity 105, outside of which map data can be unavailable. Even so, faults in GNSS data can introduce error in GNSS localization. As such, the transition condition can include multiple criteria, some based on adaptive thresholds and others based on predefined thresholds.

The transition condition corresponds to conditions at which GNSS position accurately describes the geographical position of UAV 100 and the outcomes of decision blocks 340 and 345 differ based on mission parameters. Where GNSS data do not satisfy internal quality metrics, example system 110 can invalidate GNSS data without reference to visual localization. For example, transition conditions can include a minimum number of unique GNSS signals included in GNSS data.

In some embodiments, the transition condition represents a set of one or more Boolean operators applied to a vector of Boolean and/or numerical values, as implemented, for example, in a rules-based model, to determine whether UAV 100 transitions from visual localization to GNSS localization, or vice versa. In an illustrative example, the elements of a Boolean value vector can include Boolean values representing: whether the error signal exceeds a maximum allowable threshold; whether the altitude of UAV 100 is below minimum threshold 170; and whether temporal variation exceeds a maximum threshold. In this example, the Boolean operator to validate the GNSS signal can be a NAND operator, but it is understood that by inverting the logical formulation of each element, the Boolean operator can be an AND operator. In this way, when the value of the transition condition shifts from zero to one on ascent out of base station 145, UAV 100 can transition from visual localization to GNSS localization.

Minimum altitude 170, as described in more detail in reference to FIG. 1B, can be predefined for a given base station 145 or other location (e.g., pickup or delivery point). In another example, the transition condition can include an error radius, as described in more detail in reference to FIGS. 4A-4B, that can be static or dynamic (e.g., based at least in part on the nature of vicinity 105 and/or characteristics of base station 145). In another example the transition condition can include a Boolean determination of whether the magnitude of a parity vector generated using parity space fault detection techniques is approximately zero or nonzero. In this context, "approximately zero" refers to a nominally nonzero magnitude of the parity vector that satisfies tolerances on deviation from true zero magnitude. For example, in some embodiments, the magnitude of the parity vector is normalized such that magnitude ranges from zero to one, where "approximately zero" corresponds to ±0.01, ±0.05, ±0.1, ±0.15, ±0.2, ±0.25, or the like, including fractions and interpolations thereof. In line with the formulation of the parity vector, as described in more detail in reference to FIG. 5, a magnitude of approximately zero corresponds to an absence of faults in sensor data, while a nonzero value indicates faults in one or more sensor measurements.

In some embodiments, the transition condition includes additional and/or alternative criteria. For example, temporal dynamics can be included as part of transition conditions. As part of operation 330, generating the error signal can include determining a temporal variation of the GNSS position and/or a temporal variation of the visual position. As such, during takeoff/ascent, the transition condition of decision block 340 can include a threshold for the temporal variation above which the GNSS position is invalid, despite the altitude of UAV 100 exceeding minimum altitude 170 and/or the magnitude of the error signal satisfying the transition condition (e.g., error being less than an error radius). Similarly, during approach/descent, the transition condition of decision block 345 can include a threshold for the temporal variation above which the visual position is invalid, despite the altitude of UAV 100 being less than minimum altitude 170, or the magnitude of the error signal satisfying the transition condition (e.g., error being greater than the error radius). The temporal variation determination can also include a variation in the number of GNSS satellite signals being received, one or more error metrics describing the quality of GNSS signal, or the like.

FIG. 4A is a schematic diagram illustrating an example validation technique 400 employing an error radius 415 for vertical descent of UAV 100 into a nest or pickup/delivery location, in accordance with embodiments of the present disclosure. Example validation technique 400 includes estimating a position 405 of UAV 100 by one or more techniques including, but not limited to, GNSS localization and visual localization. In vertical landing situations, UAV can approach base station 145 or pickup/delivery location in a horizontal approach and descent (e.g., mission segment 2 of FIG. 1B) until UAV 100 reaches a hover altitude 410 above a landing zone. Vertical landing (e.g., mission segment 3 of FIG. 1B) can include hovering over an unoccupied pad 150 or pickup/delivery location while performing visual localization 305. For example, where UAV 100 reaches hover altitude 410, UAV 100 can reference position 405 to request, access, and/or receive map data and begin visual localization operations, as described in more detail in reference to FIG. 3. Error radius 415 defines a circle centered about position 405 that, with hover altitude 410, defines an error cylinder 420 used as part of the transition condition for invalidating GNSS localization.

Prior to reaching the hover altitude 410, UAV 100 can rely on GNSS localization to determine position 405. At the hover position, UAV 100 can begin operations for generating the error signal (e.g., operation 330 of FIG. 3). For example validation technique 400, the error signal can include a magnitude 425 of an error vector that indicates a discrepancy between position 405 as estimated/determined by visual localization and position 405 as estimated/determined by GNSS localization. The discrepancy can correspond to a geometric difference of the two positions (e.g., a vector), the magnitude of which is a scalar value that can be compared to error radius 415.

Error radius 415 can define a transition threshold where, for values of magnitude 425 exceeding error radius 415, GNSS data are invalid. While error radius 415 is shown as a one-dimensional value that is constant with respect to altitude, in some embodiments, error radius 415 is defined as a function of position 405 (e.g., a function of altitude). For example, error radius 415 can be a linear function of altitude, such that error radius increases with altitude. In another example, error radius 415 can include nonlinear terms, such as a Heaviside function for which the step value is set at minimum altitude 170, above which some error is tolerated but below which GNSS localization is presumed to be invalid. As illustrated, magnitude 425 varies with position 405, but can also vary with time, as described in reference to FIG. 3. For example, UAV 100 can hold a hover position at altitude 410 for a given period of time to assess a temporal variation of magnitude 415. The temporal variation can be a numerical value including one or more statistical measures of change over time, such as an average magnitude, a range in magnitude values over a time window, a statistical measure of the distribution of magnitude 425 values over the time window (e.g., a variance, a statistical comparison to a target distribution), or other values that indicate whether GNSS data and/or visual localization data are varying in time above a tolerable level. In an example, temporal variation in the velocity of UAV 100 can be determined during hover and/or horizontal flight.

FIG. 4B is a schematic diagram illustrating an example validation technique 450 employing an error radius for horizontal descent and ascent of UAV 100 into and out of a nest or pickup/delivery location, in accordance with embodiments of the present disclosure. As in FIG. 4A, example validation technique 450 includes UAV 100 initiating visual localization 305 at an altitude 455 that can be predefined for a given location or can be dynamic, based at least in part on ambient weather patterns, traffic density, or other factors. As UAV 100 descends below altitude 455, position 405 is estimated/determined by GNSS localization and visual localization and the operations of example process 300 are implemented to validate or invalidate GNSS localization during descent. Where magnitude 425 exceeds error radius 415 (e.g., as an average value measured over a measurement window of a given duration), UAV 100 can transition from GNSS localization to visual localization. Conversely, on ascent from the nest or pickup/delivery location, where error radius 415 equals or exceeds magnitude 425, UAV 100 can transition from visual localization to GNSS localization and can discontinue visual localization operations, as described in more detail in reference to FIG. 3.

Advantageously, example validation technique 450 represents a relative improvement in UAV mission performance over example validation technique 400, in that horizontal descent and/or horizontal ascent as described do not include a hover phase during which UAV 100 holds a position over a landing or pickup/delivery location. In this way, example technique 450 can be completed during flight and does not add length to the mission of UAV 100. Conversely, example technique 400 can improve accuracy of localization in relatively crowded nest locations, in areas with high air or land traffic, and in dynamic conditions. In some embodiments, example system 110 monitors conditions at or near vicinity 105 (e.g., via communication with weather and/or aircraft control systems) to determine whether to implement example technique 400 or example technique 450. In some embodiments, mission data provided to UAV 100 can indicate one validation technique or the other. In an illustrative example, UAV 100 can receive mission data indicating a pickup of an object from a relatively remote or otherwise unpopulated area and a delivery of the object to a relatively dense area, for which example technique 450 is indicated for the pickup and example technique 400 for the delivery. During the mission, example system 110 can monitor conditions at the pickup location to determine whether to switch to a vertical descent by modifying mission data. In this way, example techniques 400 and 450 improve the performance of UAV 100 individually and can provide flexibility when used in an adaptive system that permits UAV 100 to balance competing objectives of aircraft safety with mission progress.

FIG. 5 is a schematic diagram illustrating an example technique 500 for validating a position of a UAV without reference to geo-fiducials using a parity space fault detection technique, in accordance with embodiments of the disclosure. As described in more detail in reference to FIG. 3, parity space techniques include defining a coordinate system using two or more redundant sensors measuring the same value (e.g., longitude, latitude, altitude, etc.) and determining a value of a parity vector in that coordinate system, the magnitude of which can be used to detect sensor faults.

As illustrated, UAV 100 can determine a GNSS position during flight by receiving GNSS signals 505 from satellites of the GNSS system. Near the ground, reflected GNSS signals 510 can introduce error in position and altitude measurements of GNSS position that increase with the number, size, and orientation of surface structures or features relative to the locations of GNSS satellites. In some cases, visual localization can also be error prone, however, as when map data is of poor quality or unavailable. For example, where map data includes labeled images of vicinity 105, but relatively few labeled images are available, semantic localization techniques can return a visual position with a relatively large error. In circumstances where both localization techniques are possible sources of error, parity space techniques can control for the situation where GNSS localization is erroneously validated by detecting error in one or both sensors.

When multiple sensors are used to measure the same quantity, it becomes possible to detect errors in sensor measurements. If measurements are available from two sensors, significant disagreement between them indicates the presence of a fault in one of the sensors. Sensor fault can be identified where a third independent measurement is available. In the example of UAV 100, the position of UAV 100 as a function of time includes elements such as latitude, longitude, and altitude. Latitude can be measured by GNSS and visual localization. Altitude can be measured by multiple sensors, including barometers, laser rangefinders, GPS, and visual localization.

As a mathematical formulation, the parity space is defined using an equation relating a state, "x," which is a vector of "n" state variables, with a vector "z" of "m" measurements of the measured value (e.g., longitude, latitude, altitude, etc.), where "n" and "m" are integers, via a measurement matrix "H," as shown in the expression:

$$z=Hx$$

In example technique 500, it is assumed that matrix H is of rank n, such that the m measurements fully span the state space and observe the state vector x, and it is assumed that m>n, meaning that measurements are redundant for a given measurand (referring to the measured value). With these assumptions, a parity space "P" can be defined as an (m−n)-by-m matrix that has a rank equal to m−n, the matrix product of P and its transpose equals one, and the matrix product of P and H equals zero, as shown in the set of expressions:

$$\text{Rank}(P)=m-n$$

$$pp^T=1$$

$$PH=0$$

In this way, matrix P spans the null space of matrix H, with its rows serving as an orthonormal basis for the parity space. P can be determined via QR factorization of H, or by finding an orthonormal basis for the range of matrix S, defined using the expression:

$$S=I-H(H^TH)^{-1}H^T$$

where I is the identity matrix.

With P defined as described above, a parity vector "p" can be defined with m−n elements using the expression:

$$p=Pz$$

The parity vector is described by at least three properties that are relevant to fault detection. First, "p" is independent of the space vector x. Second, the expected value of p for a no-fault condition is zero. Third, the expected value of p in a fault condition is a function of the fault. The first and second properties derive from the expression that PH=0. The third property can be demonstrated using the generalized expression:

$$z=Hx+b_ie_i+v$$

where $e_i$ is a vector of length "m" with a value of one in the $i^{th}$ position and zeros in other positions, where v is a zero-mean random noise term, and where $b_i$ is a fault of magnitude "b" in sensor "i." Introducing the expression for p into the expression above via an E matrix including e vectors for i=1 to m, gives the expression:

$$E[p]=PE[Hx+b_ie_i+v]=E[Pb_ie_i]=P_ib_i$$

From the expression above, it is seen that where $b_i$ is zero, p is zero, but where the $b_i$ is nonzero, the value of p is nonzero. The fault term, can be a function, rather than a constant, which can depend at least in part on one or more variables, such that an absolute threshold for declaring a sensor fault can be unavailable. Even so, the properties of the parity vector can be applied to sensor fault detection. For example, the parity vector is expected to have a nonzero magnitude that is close to zero in a no-fault case where sensor noise is also nonzero. In this way, where the magnitude of the parity vector p is greater than the expected level of noise in the sensor measurements, a fault can be declared.

Three or more redundant measurements can be used to identify a faulty sensor using the parity space technique described above and to estimate the magnitude of the error. In the context of the present disclosure, positional information for UAV 100 can be generated by multiple redundant sensors 115, but fewer redundancies are available for some measurands than others. In an illustrative example, longitude and latitude can be measured using GPS, visual localization, and geofiducials. Without resorting to geofiducials, however, example system 110 can generate three redundant measurements of longitude and/or latitude by implementing multiple visual localization techniques in parallel. In reference to example process 300 of FIG. 3, visual localization 305 can include receiving map data that is structured for VPS localization, receiving map data that is structured for semantic localization, generating image data for each respective technique, and determining redundant visual positions using each respective technique. In this way, three redundant measurements of position can be generated.

In some embodiments, error in GNSS data is assessed by implementing a second parallel fault detection process. For example, altitude 515 can be measured by multiple redundant sensor(s) 115 including barometer, laser rangefinder, GPS, visual localization, radio telemetry, etc. As GNSS altitude measurements are based at least in part on geometric calculation using signals 505 and 510 received from multiple GNSS satellites, with which GNSS position is also determined, altitude can be used as an approach to identify GNSS faults when parity space fault detection of UAV 100 longitude and/or latitude indicates a fault in a doubly redundant measurement.

In some embodiments, parity space techniques can be implemented using individual GNSS satellite measurements (e.g., GNSS position data) and measurements of relative position using features or landmarks (e.g., in a sequence of images, in different images, etc.), referred to as visual position data. GNSS data can include multiple redundant measurements based on signals 505 and 510, of which some may be erroneous. Similarly, visual position data, generated by visual localization 305 processes, can include individual measurements based on features or landmarks 160, of which a portion can be erroneous. When fused as part of generating the visual position, faulty individual measurements included in position data can introduce error in position estimation. In this way, parity space techniques enable detection of errors at the individual satellite and visual feature/landmark level, so that faulty measurements can be excluded from fusion processes that in turn reduce the error used in other techniques, (e.g., the error radius techniques of FIGS. 4A-4B), and/or to improve position estimation from GNSS and visual localization.

The sensor or signal most likely to be faulted can be obtained by determining the orthogonal distance between the parity vector p and each fault axis (the columns of P). The sensor most likely to be faulted will be the one with the smallest such distance, which can be expressed mathematically using the expression:

$$\mathrm{argmin}_i(g_i^T g_i)$$

where $g_i$ is the vector perpendicular to a coordinate axis i in the parity space, expressed mathematically using the expression:

$$g_i = (p^T P_i) P_i - p$$

The result of the minimization argument described above is that the coordinate axis in the parity space with which the parity vector is most closely oriented can be identified as the source of the sensor fault. In an illustrative example, the parity space can include three coordinate axes corresponding to two different visual position measurement techniques (e.g., VPS and semantic localization) and GPS. Where the magnitude of the parity vector exceeds the expected sensor noise under the no-fault assumption, the sensor fault can be identified with GNSS position in accordance with the parity vector being more closely oriented toward the GNSS axis than toward the axes corresponding to the different visual localization measurement. Similarly, with altitude measurement, fault in altitude data can be detected by comparing the magnitude of the parity vector to a threshold magnitude and can be identified as originating in the GNSS data by comparing the orientation of the parity vector toward the GNSS coordinate axis in the parity space.

For the purposes of GNSS validation, relative error magnitude can be used to determine whether to transition from GNSS localization to visual localization or to modify mission parameters to avoid navigation using faulty data. For example, parity space fault detection can identify GNSS data as faulty, but can also indicate that visual localization is faulty, such that it is unclear whether to transition or not. In such intermediate cases, a comparison of GNSS error to visual position error can permit UAV 100 to decide whether to continue with a mission. The estimated fault magnitude for a given sensor i can be expressed mathematically using the expression:

$$\mathrm{error}_i = p^T P_i$$

where $\mathrm{error}_i$ represents the magnitude of the projection of the parity vector p onto the coordinate axis corresponding to sensor i. The error in the unfaulted measurements can be estimated by computing the projection of the residual parity vector $g_j$ onto the coordinate axes corresponding to the redundant measurements (e.g., visual localization), using the expression:

$$\mathrm{error}_j = g_i^T P_j$$

In this way, the relative error in measurements can be used to determine whether a transition from GNSS measurement of the measurand to another modality or vice versa is safe or should be avoided. As with the case of parity vector magnitude, temporal variation can inform the relative error magnitude analysis. For example, temporal variation can be included as part of a transition condition such that transition from one measurement modality to another is precluded when sensor measurements vary in time above a threshold value.

In an illustrative example of modifying mission data, UAV 100 can assume a hover position above a pickup or delivery location for which limited map data is available. Where visual localization includes relatively high error, UAV 100 can modify its mission to avoid descending below minimum altitude 170 where GNSS data is presumed invalid. In another illustrative example, UAV 100 can initiate a takeoff from base station 145 and can ascend to transition altitude 175. In the circumstance where an error in GNSS data is identified, UAV 100 can return to base station 145, rather than continuing to the original destination.

Advantageously, the techniques described herein can be implemented alone or in combination, as part of an algorithm for managing computational and energy resources of UAV 100. For example, the error radius techniques of FIGS. 4A-4B can be combined with parity space fault detection techniques to provide multiple approaches for GNSS validation. In some embodiments, GNSS validation techniques include conditional logic whereby an error signal above a given magnitude can trigger secondary analysis using parity space fault detection.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer-implemented method for validating a position of an unmanned aerial vehicle (UAV), the method comprising:
   receiving map data for a location, the map data comprising labeled data for a plurality of landmarks in a vicinity of the location;
   generating image data for the location, the image data being derived from images of the vicinity generated by the UAV including at least a subset of the plurality of landmarks;
   determining a visual position of the UAV using the image data and the map data;

determining a Global Navigation Satellite System (GNSS) position of the UAV;

generating an error signal using the visual position and the GNSS position; and validating the GNSS position in accordance with the error signal satisfying a transition condition that is used to determine when to localize the UAV based on the visual position or the GNSS position, wherein generating the error signal comprises generating an error vector using the visual position and the GNSS position, and wherein the transition condition comprises a threshold magnitude of the error vector above which the GNSS position is deemed invalid.

2. The computer-implemented method of claim 1, wherein generating the error signal comprises generating a parity vector based at least in part on visual position data and GNSS position data, and wherein the transition condition comprises a threshold magnitude of the parity vector above which the GNSS position is invalid.

3. The computer-implemented method of claim 2, wherein the visual position data comprise multiple feature measurements from multiple features in the vicinity and the GNSS position data comprise multiple GNSS measurements from multiple satellites of the GNSS system, and wherein generating the parity vector comprises defining a parity space using the feature measurements and the GNSS measurements and determining the magnitude of the parity vector in the parity space.

4. The computer implemented method of claim 2, further comprising determining a magnitude of noise in the parity vector, wherein the threshold magnitude of the parity vector is about equal to the magnitude of noise.

5. The computer implemented method of claim 2, wherein:

the visual position of the UAV is a first visual position of the UAV;

determining the visual position of the UAV comprises generating the first visual position using a first technique and generating a second visual position using a second technique different from the first technique;

generating the error signal comprises generating the parity vector based at least in part on the first visual position, the second visual position, and the GNSS position; and the transition condition further comprises a comparative condition for which GNSS data is invalid where the parity vector is more closely oriented toward a first coordinate axis in a parity space corresponding to the GNSS position than toward a second coordinate axis in the parity space corresponding to the first visual position or the second visual position.

6. The computer implemented method of claim 2, wherein the parity vector is a first parity vector and the magnitude is a first magnitude, the method further comprising:

generating altitude data using two different altitude sensors of the UAV;

determining a GNSS altitude of the UAV;

generating a second parity vector based at least in part on the GNSS altitude and the altitude data; and isolating a source of sensor error to the altitude data or the GNSS position, based at least in part on a second value of the second parity vector.

7. The computer implemented method of claim 1, wherein the transition condition comprises a minimum altitude below which the GNSS position is invalid.

8. The computer implemented method of claim 1, further comprising:

initiating an ascent of the UAV from the location; and discontinuing visual localization in accordance with the error signal satisfying the transition condition.

9. The computer implemented method of claim 1, further comprising:

initiating a descent of the UAV toward the location; and transitioning from GNSS localization to visual localization in accordance with the error signal failing to satisfy the transition condition.

10. The computer implemented method of claim 1, wherein generating the error signal comprises determining a temporal variation of the GNSS position and wherein the transition condition comprises a threshold for the temporal variation above which the GNSS position is invalid.

11. The computer implemented method of claim 1, wherein generating the error signal comprises determining a temporal variation of the visual position and wherein the transition condition comprises a threshold for the temporal variation above which the visual position is invalid.

12. The computer implemented method of claim 1, further comprising:

modifying a mission of the UAV in accordance with GNSS data failing to satisfy the transition condition.

13. At least one machine-accessible storage medium onboard an unmanned aerial vehicle (UAV) storing instructions that, when executed by circuitry of the UAV, will cause the circuitry to perform operations comprising:

receiving map data for a location, the map data comprising labeled data for a plurality of landmarks in a vicinity of the location;

generating image data for the location, the image data being derived from images of the vicinity generated by the UAV including at least a subset of the plurality of landmarks;

determining a visual position of the UAV using the image data and the map data;

determining a GNSS position of the UAV;

generating an error signal using the visual position and the GNSS position; and validating the GNSS position in accordance with the error signal satisfying a transition condition that is used to determine when to localize the UAV based on the visual position or the GNSS position, wherein generating the error signal comprises generating a parity vector based at least in part on visual position data and the GNSS position data, wherein the transition condition comprises a threshold magnitude of the parity vector above which the GNSS position is invalid.

14. The at least one machine-accessible storage medium of claim 13, wherein generating the error signal further comprises generating an error vector using the visual position and the GNSS position, wherein the transition condition comprises a threshold magnitude of the error vector above which the GNSS position is invalid.

15. The at least one machine-accessible storage medium of claim 13, wherein the visual position data comprise multiple feature measurements from multiple landmarks in the vicinity and the GNSS position data comprise multiple GNSS measurements from multiple satellites of the GNSS system, and wherein generating the parity vector comprises defining a parity space using the feature measurements and the GNSS measurements and determining a magnitude of the parity vector in the parity space.

16. The at least one machine-accessible storage medium of claim 13, further comprising determining a magnitude of noise in the parity vector, wherein the threshold magnitude of the parity vector is about equal to the magnitude of noise.

17. The at least one machine-accessible storage medium of claim 13, wherein:
- the visual position of the UAV is a first visual position of the UAV;
- determining the visual position of the UAV comprises generating the first visual position using a first technique and generating a second visual position using a second technique different from the first technique;
- generating the error signal comprises generating the parity vector based at least in part on the first visual position, the second visual position, and the GNSS position; and
- the transition condition further comprises a comparative condition for which GNSS data is invalid where the parity vector is more closely oriented toward a first coordinate axis in a parity space corresponding to the GNSS position that toward a second coordinate axis in the parity space corresponding the first visual position or the second visual position.

18. The at least one machine-accessible storage medium of claim 13, wherein generating the error signal further comprises determining a number of unique GNSS signals included in the GNSS data, wherein the transition condition comprises a minimum number of unique GNSS signals included in the GNSS data, below which the GNSS data is invalid.

19. The at least one machine-accessible storage medium of claim 13, wherein the transition condition comprises a minimum altitude below which the GNSS position is invalid.

20. The at least one machine-accessible storage medium of claim 13, wherein generating the error signal comprises determining a temporal variation of the GNSS position and wherein the transition condition comprises a threshold for the temporal variation above which the GNSS position is invalid.

* * * * *